TRAFFIC OBSERVATION SYSTEM

Filed Nov. 21, 1960 5 Sheets-Sheet 1

INVENTOR.
ARTHUR T. SIGO
BY
Kegan, Bellamy & Kegan
ATTORNEYS

Feb. 9, 1965 A. T. SIGO 3,169,169

TRAFFIC OBSERVATION SYSTEM

Filed Nov. 21, 1960 5 Sheets-Sheet 2

Feb. 9, 1965 A. T. SIGO 3,169,169

TRAFFIC OBSERVATION SYSTEM

Filed Nov. 21, 1960 5 Sheets-Sheet 4

United States Patent Office 3,169,169
Patented Feb. 9, 1965

3,169,169
TRAFFIC OBSERVATION SYSTEM
Arthur T. Sigo, 2021 S. 5th Ave., Maywood, Ill.
Filed Nov. 21, 1960, Ser. No. 70,528
10 Claims. (Cl. 179—8)

Figure 1:
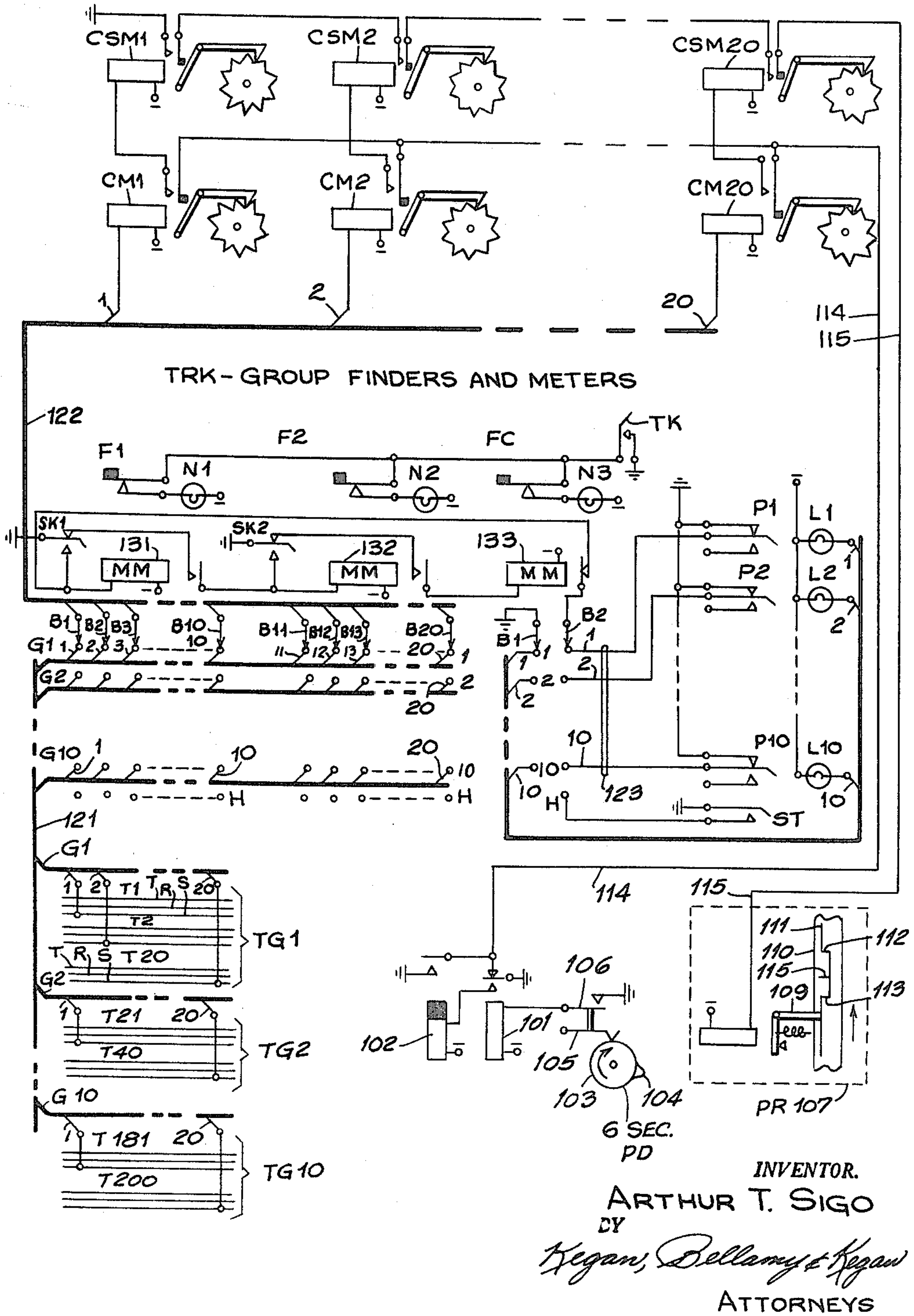

This invention relates to systems and apparatus for observing traffic or traffic load from time to time on desired trunk groups of a switching system, such as a dial telephone system. The main object of the invention is to provide a new and improved system of the foregoing character which is economical to produce and easy to use, and provides data of sufficient reliability and extent that determinations as to whether or not trunk additions, or regroupings, or both are required.

In switching systems of the indicated type, it is well known that a careful balance of the calls offered to trunk groups must be maintained in order that the number of trunks is kept at or about the number actually required for the rendering of an established grade of service thereover during busy periods. Such a period is commonly referred to as the busy hour. The common grades of service used comprise one lost call in a thousand (1:1000), one lost call in a hundred (1:100), and one lost call in fifty (1:50), and one grade or another is used, depending upon the nature and location of the trunk group within the switching system.

Keeping in mind the fluctuating nature of telephone traffic as new telephones are placed in service, existing telephones are disconnected, and class-of-service changes are made among the telephone lines, for example, it is clearly necessary to maintain a close traffic check to the end that trunk groups are not permitted to remain greatly underloaded nor substantially overloaded. The arrangements heretofore employed for securing traffic data have been open to the drawbacks that either they require too much apparatus or are too cumbersome and time-consuming.

According to the invention, the foregoing and other drawbacks of the prior service observation arrangements have been overcome by a new and improved observation arrangement which employs a minimum of simple stepping switches and simple control apparatus for observing the traffic conditions on any desired one of the trunk groups of an installation, and which may be used to provide both total-call and total-occupancy data.

Further according to the invention, a simplified trunk-scanning and switching arrangement is provided which is associatable with desired ones of a large number of trunk groups, whereby it is suitable for either medium or large installations.

According to one feature of the invention, a first group of busy-count meters, comprising a separate meter for each trunk of the group currently under observation, is provided for giving a total of the calls handled by the trunk group during the observation period, and a group of time-pulse meters is provided, controlled through contacts of the respective meters of the first group to record the total occupancy time of the respective trunks of the group. A related feature includes the use of a recording device controlled through a contact chain of the time-pulse meters to provide a permanent record of the total time during the period of observation that all trunks in the group are in use.

According to a further feature, a trunk scanner is employed which is operable to make repeated scannings of a predetermined number of trunk terminations and to transmit a busy-trunk pulse for each scanned trunk found to be in use. According to a related feature, the trunks scanned on a single operation of the scanner may comprise a succession of trunk groups, and a group-meter switch is provided to direct the busy-trunk pulses of the trunk groups to respective group meters each of which records the total busy-trunks encountered in the corresponding trunk group during a predetermined number of scanning operations.

A further feature is that the trunk groups scanned may vary in size, arrangements being provided for appropriately controlling the operations of the distributing group meter switch.

According to another feature, counting apparatus is provided which counts the number of scanning cycles performed by the scanner and terminates the scanning operation responsive to the counting of a predetermined number of the scanning cycles.

Other features of the invention include the provision of control-turret and group-finder apparatus which acts to select trunk groups to be scanned and to progressively and cyclically call in the trunk groups for scanning.

Figures 2, 2A, 2B:
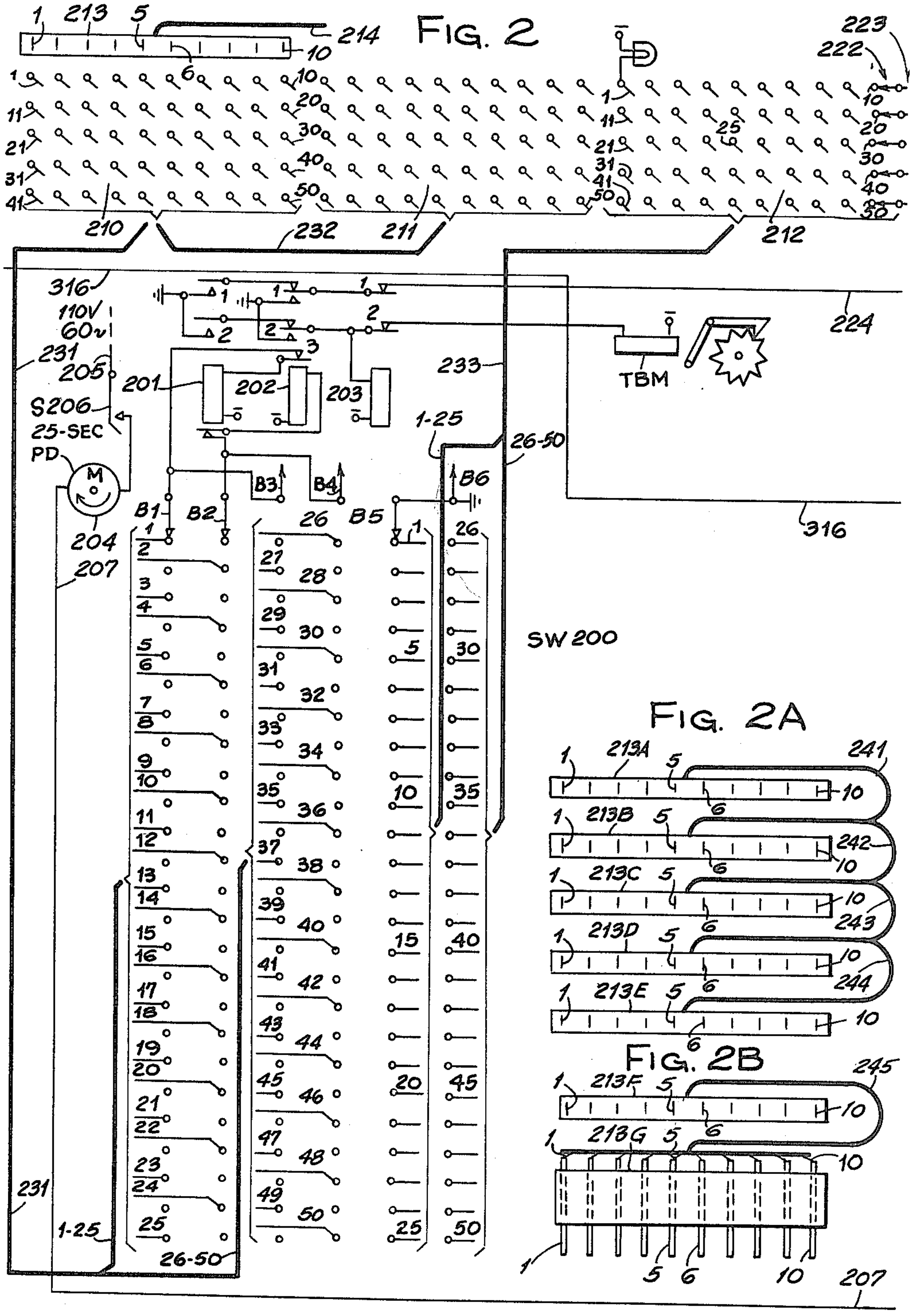
Figure 3:
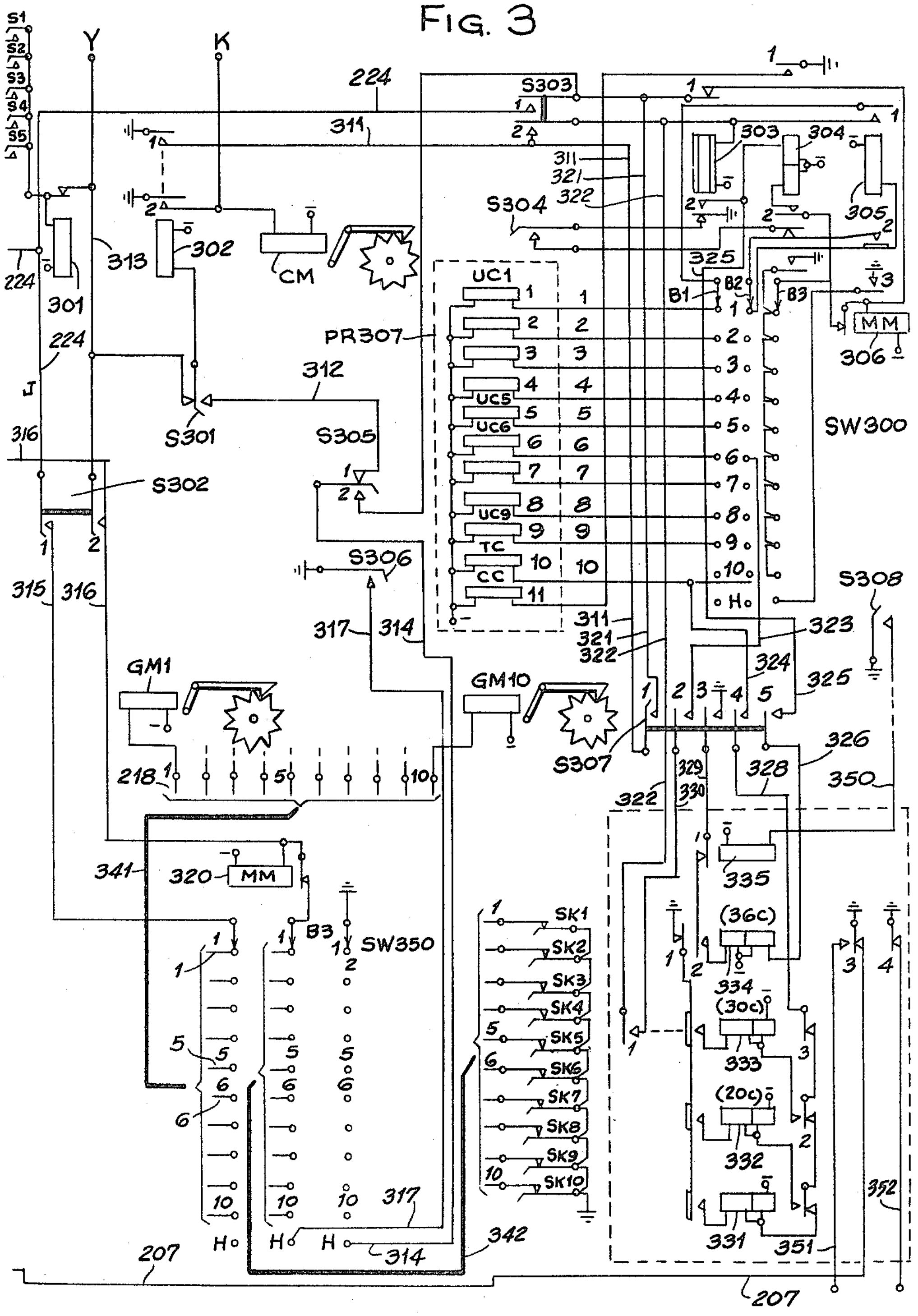
Figures 4, 6:
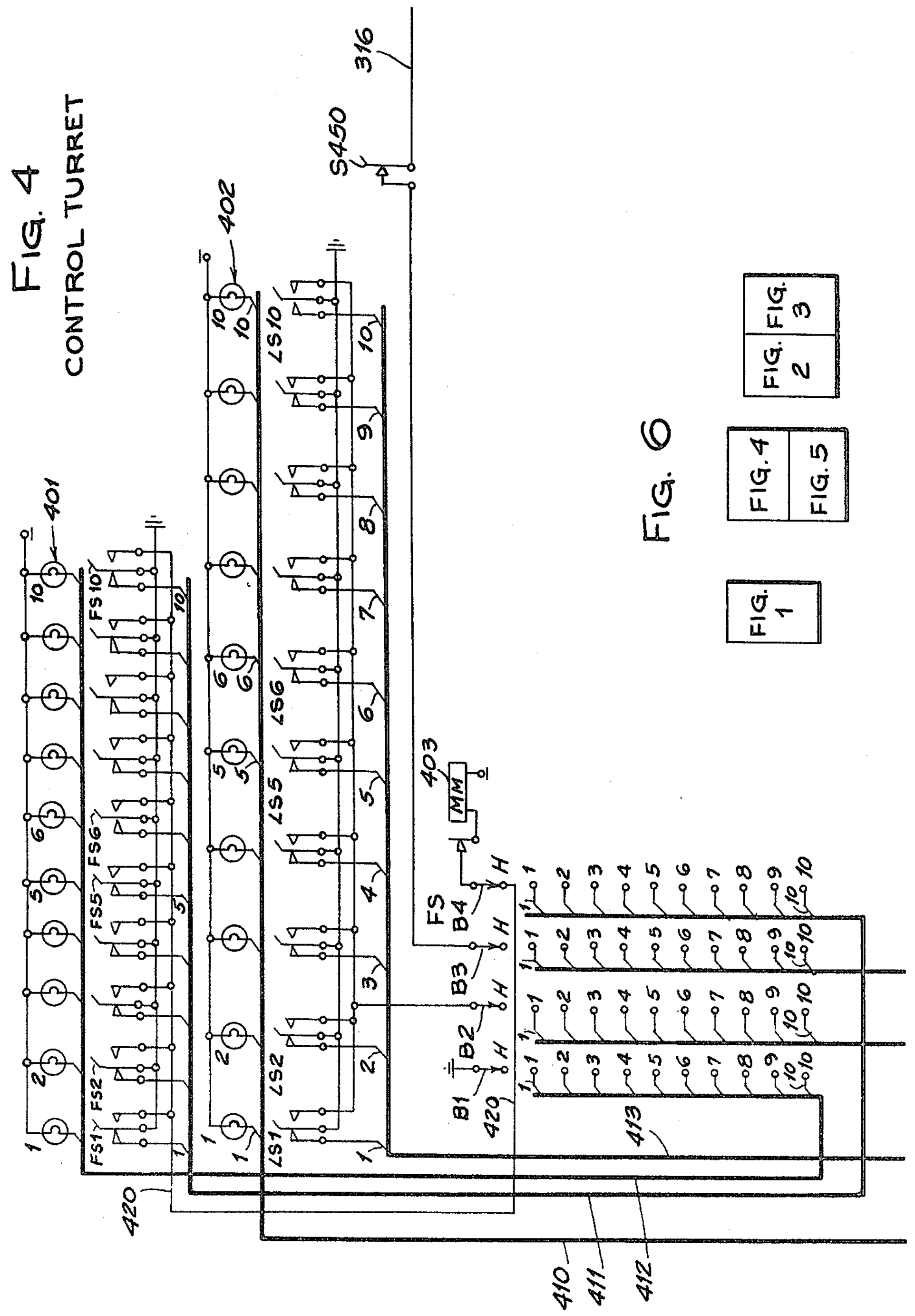
Figure 5:
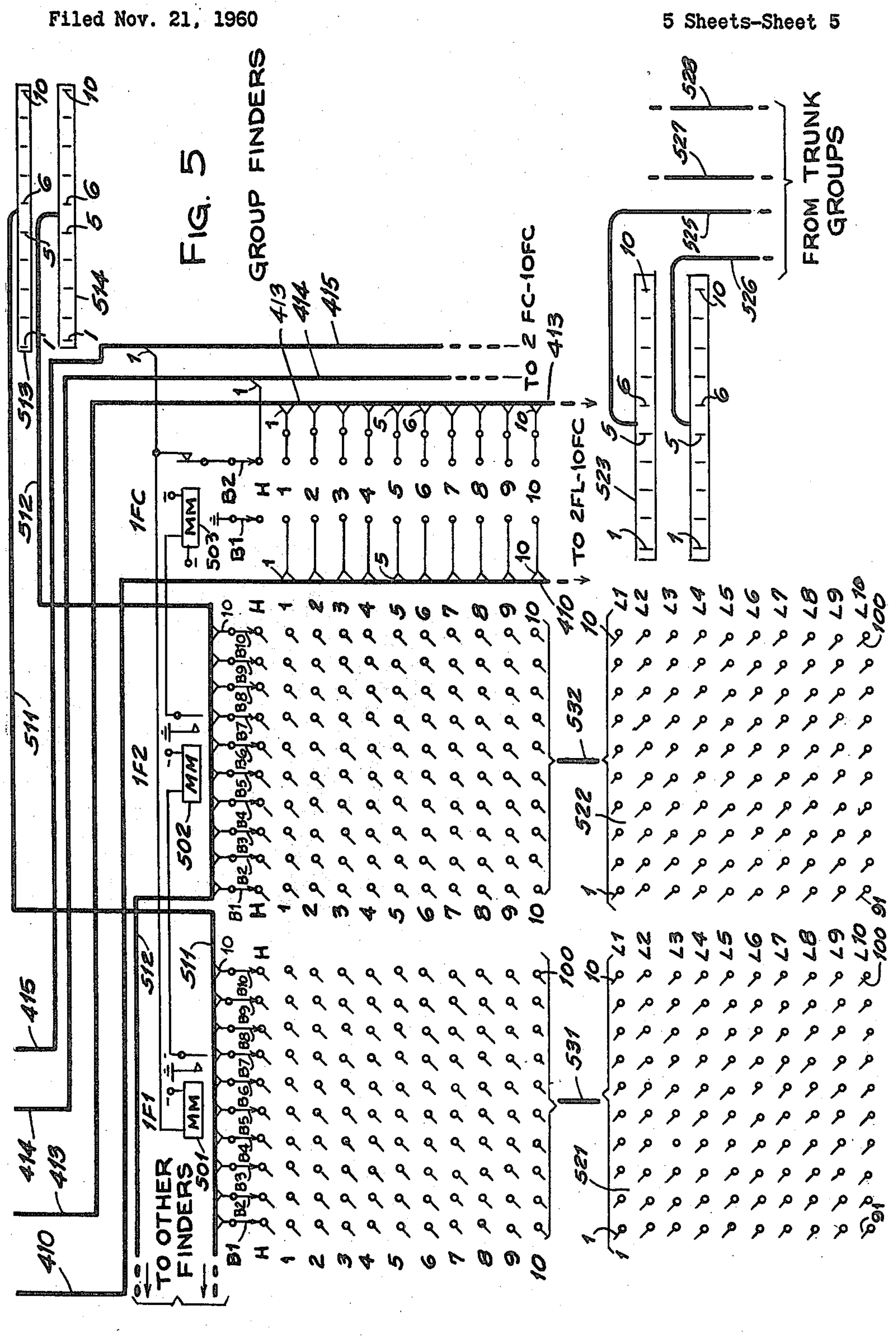

The above mentioned and other objects and features of this invention and the manner of obtaining them will become more apparent, and the invention itself will be better understood, by reference to the following description of an embodiment of the invention taken in conjunction with the accompanying drawings comprising FIGS. 1 to 6, wherein:

FIG. 1 discloses a simple arrangement for observing any desired one of ten groups of trunks and for recording traffic data concerning any trunk group observed;

FIG. 2 discloses a scanner capable of scanning and for signaling the busy or idle condition of each of a total of fifty trunks during a single scanning operation, together with a totalling meter for recording a total of the number of busy trunks encountered;

FIG. 3 discloses structure usable in association with FIG. 2 for recording data concerning individual ones of groups within those assigned for scanning by the structure of FIG. 2, along with apparatus for recording the total number of scanning cycles, and including circuit apparatus for automatically terminating the scanning operation at the end of a predetermined number of scanning cycles;

FIG. 4 discloses a control turret for use with the apparatus of FIGS. 2, 3, and 5;

FIG. 5 shows one of ten group finders usable with FIGS. 2, 3, and 4 to call in trunk groups to be scanned by the scanner of FIG. 3; and FIG. 6 shows how the drawings on which FIGS. 1 to 5 are drawn should be arranged to be understood best.

FIG. 1.—TRUNK-FINDER SYSTEM

FIG. 1 shows a system for recording the traffic conditions on trunk groups up to a total of 200 trunks. It comprises a pair of finders F1 and F2, F1 having brushes B1 to B10 and F2 having brushes B11 to B20. It further comprises a finder-control switch FC having brushes B1 and B2; control pushbuttons P1 to P10 and ST; a set of indicating lamps L1 to L10; pulsing apparatus 101 to 106; and busy-trunk recording apparatus comprising meters CM1 to CM10 and CSM1 to CSM10, together with pen recorder PR107.

The finders F1 and F2 have an 11-point contact bank for their brushes B1 to B20. Of the bank contacts for any brush, the first, second, tenth, and eleventh contacts H are shown. For convenience of illustration, the brushes B1 to B20 are illustrated as positioned on their first contact set.

The brushes B1 and B2 of finder-control switch FC are provided with an 11-point contact bank, the brushes B1 and B2 of FC being illustrated as standing on a first contact set for convenience of illustration.

The contacts 1 to 10 in the bank of brushes B1 to B20 of switches F1 and F2 are extended by the 200 conductors in cable 121 into association with respective ones of the trunks T1 to T200, which comprise ten 20-trunk groups TG1 to TG10. Each trunk T1 to T200 is shown as the usual 3-conductor trunk over which connections are established in the well-known manner in a dial-type of switching system, for example. Each such trunk comprises the usual tip, ring, and sleeve conductors T, R, and S.

The trunk groups TG1 to TG10 correspond respectively to groups G1 to G10 into which the cable 121 is divided at each end, each such cable division corresponding to a separate one of the positions 1 to 10 of finder-switch brushes B1 to B20. That is, when the brushes B1 to B20 are standing on contacts 1, they are connected over the respective conductors in group G1 of cable 121 to the sleeve conductors S of trunks T1 to T20 of trunk group TG1. Similarly, when the brushes B1 to B20 have been advanced to position 2, they are extended over the conductors in group G2 of cable 121 to the sleeve conductors of trunks T21 to T40 of trunk group TG2, and so on to the tenth position of the brushes, wherein they are extended by way of group G10 of conductors in cable 121 to the sleeve conductors of trunks 181 to 200 in trunk group TG10.

When the brushes of the switches F1, F2, and FC are standing in their eleventh or home position, rather than in their illustrated first position, off-normal contacts ON1, ON2, and ON3 are closed in the usual manner by the respective switches F1, F2, and FC. This eleventh or home-position condition may be assertained by a monentary operation of test TK, which causes normal lamps N1, N2, and N3 to light subject to the three associated switches being in home position. If, for example, switch F1 is not in home position, that fact is indicated by the failure of lamp N1 to light when TK is actuated, since its contacts ON1 are then open. To bring switch F1 into its normal, or home, position with affecting either of the other two switches, stepping key SK1 is momentarily actuated and released the required number of times to advance switch F1 to its home position. On each operation of key SK1, motor magnet 131 is thereby preparing to advance the brushes B1 to B10. When the key SK1 is restored, the consequent deenergization of 131 permits the brushes B1 to B10 to advance one step. When F1 has been advanced to home position, that fact is indicated by the lighting of lamp N1 through TK and ON1. Key SK2 is similarly associated with F2.

Preferably, the meters CM1 to CM20 and CSM1 to CSM20 are the type which can readily be restored to a zero reading before the calling in of any group TG1 to TG10 of the trunks for observation. Otherwise, the operation records the respective readings of these meters before calling in a trunk group for observation. As a further perliminary step, the operator starts the driving apparatus (not shown) for tape 110 of the pen recorder PR107 into operation, to begin tracking line 111 on the tape.

The normal position of structure 109 of the pen recorder causes line 111 to be along the left side of tape 110, rather than an offset location to the right, as well as further referred to.

OBSERVING TRUNK GROUP TG1

If, for example, trunk TG1 is to be observed, and if the brushes of switches F1, F2, and FC are in their home position as previously noted, pushbutton P1 is first actuated to disconnect ground from contact 1 of brush B2 of finder-control switch FC, contacts 2 to 10 of the said brush B2 remaining grounded through pushbuttons P2 to P10. Start button ST is now operated, thereby grounding home contact H of brush B2 of FC. A circuit is thereupon closed through the normally closed contacts of motor magnet 133 for operating motor magnet 131, which makes the usual preparation for the advance of brushes B1 to B10 one step on release of 131, at the same time closing an operating circuit for motor magnet 132. Motor magnet 132 similarly prepares to advance brushes B11 to B20 and closes an operating circuit for motor magnet 133. Motor magnet 133 is thereby energized to prepare to advance its brushes B1 and B2, and it opens its local contacts. Motor magnets 131, 132, and 133 responsively restore in sequence, each thereby advancing the brushes one step, from home position H to first position, on their contacts 1. Start button ST may now be released. Switches F1, F2, and FC remain in this attained first position as long as pushbutton P1 remains operated, since no actuating ground potential is now encountered by brush B2 of FC.

In practice, the switches F1, F2, and FC are left on a called-in trunk group for a predetermined part of an hour, such as one-quarter hour, which fact may be printed or written on the test record. During the observation period, considering, for example, trunk T1 of the group TG1 under observation, each time that trunk T1 is taken for use, the usual busy-marking ground potential appears on the sleeve conductors thereof; thereby placing ground on brush B1 of F1 over conductor 1 of cable 121. A circuit is thereby closed over conductor 1 of cable 122 for the electromagnet of total-calls meter CM1. This meter is thereupon operated to show the next higher number (to show the number 1 if it has been adjusted to zero reading as assumed). The magnet of CM1 remains energized as long as the associated trunk T1 of group G1 remains in use. The now-closed contacts of meter CM1 close a circuit from ground on 6-second conductor 114 for the magnet of the holding-time meter CSM1, thereby causing the latter meter to advance to its next highest units setting.

Every six seconds, ground is momentarily removed from 6-second conductor 114 by the hereinafter described operation of relays 101 and 102. Upon any such momentary interruption, the magnet of CSM1 is momentarily deenergized to prepare for the next reading advance, and is promptly energized again to advance the count one unit.

If the trunk T1 to which the magnet of meter TM1 is now connected remains busy for ninety seconds, for example, only a single reading of meter CM1 is obtained to show the one call observed. On the other hand, fifteen operations of meter CSM1 occur because of the described momentary removal of ground from conductor 114 at six 6-second intervals. The remaining meters TM2 to TM20 are respectively energized responsive to seizures of trunks T2 to T20 of group TG1 under observation, and the electromagnet of any such meter remains energized as long as its associated trunk is maintained in use. The meter at which any such energization occurs is advanced one unit when energized, retaining the new reading until later deenergized and is energized again.

The holding-time meters CSM2 to CSM20 are controlled by meters CM2 to CM20 from the 6-second ground conductor 114 as described for meters CM1 and CSM1.

When the predetermined 15-minute interval of observation of the trunks in group TG1 has elapsed, pushbutton P1 is restored, replacing ground on contact 1 in the bank of brush B2 of switch FC, causing motor magnets 131 to 133 to energize in succession as described, whereupon the initial energizing circuit is broken by the disconnection of brush B2 by motor magnet 133. The magnets 131 to 133 thereupon restore to advance the brushes of all three switches F1, F2, and FC one step, onto the second contacts of each brush. The step-by-step advance of F1, F2, and FC continues comparatively rapidly until their brushes have passed over contact sets 2 to 10 to reach their eleventh position H, whereupon the brushes stop because of the restored condition of start button ST.

The 15-minute observation period, for the twenty trunks of TG1 having been terminated as described, the operator is expected to tabulate the readings imparted during the observation to total-calls meters CM1 to CM20, together with the readings imparted to call-seconds meters CSM1 to CSM20, as in Table I appearing below:

*Table I*

| No. | CM | CSM |
|---|---|---|
| 1 | 16 | 336 |
| 2 | 17 | 334 |
| 3 | 18 | 337 |
| 4 | 17 | 340 |
| 5 | 16 | 340 |
| 6 | 16 | 337 |
| 7 | 16 | 337 |
| 8 | 16 | 336 |
| 9 | 18 | 332 |
| 10 | 18 | 339 |
| 11 | 18 | 340 |
| 12 | 16 | 336 |
| 13 | 16 | 334 |
| 14 | 18 | 337 |
| 15 | 16 | 340 |
| 16 | 17 | 337 |
| 17 | 18 | 340 |
| 18 | 17 | 337 |
| 19 | 17 | 336 |
| 20 | 16 | 337 |
| | 337 | 6,740 |

In the above Table I, the numbers 1 to 20 in column 1 identify the respective total-calls meters CM1 to CM20 having the readings appearing in column 2, and identify the meters CSM1 to CSM20 having the readings appearing in column 3.

It will be observed that the total of the meter readings appearing in column 2 (meters CM1 to CM20) is 337. Trunks T1 to T20 of trunk TG1 are thereby shown to have handled a total of 337 calls during the 15-minute observation interval covered by Table I, which is an average of 4.2 calls per trunk.

The second column of Table I shows a total of 6740 operations of call seconds meters CSM1 to CSM20, each reading representing a 6-second trunk occupancy interval.

Simple calculations may be made from the data in Table I to arrive at the data shown in Table II, appearing below:

*Table II*

| A | B | C | D | E |
|---|---|---|---|---|
| Total Calls | 6-Sec. Calls | Call Seconds | 100-Sec. Calls | Average Length, Seconds |
| 337 | 6,740 | 40,440 | 404.40 | 120.00 |

In the above Table II, columns A and B show the total for the second and third columns of Table I, while column C represents the reading in column B multiplied by 6, to give the total call seconds of trunk occupancy within the observed trunk group during the 15-minute observation period.

The total (40,440) shown in column C is divided by 100 to give the reading in column D (404.40) of 100-second calls, sometimes termed unit calls.

The call-second total (40,440) of column C is divided by the total calls (337) of column A to provide the average holding time (120 seconds) shown in column E. The unit-calls reading (404.40) in column D may be compared with standard traffic tables for trunks in a group of 20. The well-known Molina traffic tables show, for 20 trunks in a group, that their traffic handling capacity in unit calls (100-seconds length) varies according to the desired grade of service, as follows:

(1) For one lost call in a thousand, 323 unit calls;
(2) For one lost call in a hundred, 399 unit calls; and
(3) For one lost call in fifty, 429 unit calls.

From the above, it will be seen that the column D figure of Table II (404.40) unit calls) is considerably in excess of the 323 unit calls permissible for one lost call in a thousand (1:1000); is only 5.4 unit calls in excess of the 399 unit calls permissible for one lost call in a hundred (1:100); and is about 25 unit calls lower than the 429 unit calls permissible for one lost call in fifty (1:50). It is clear, therefore, that the trunk group TG1 which has been observed was greatly overloaded for a 1:1000 grade of service; was only mildly overloaded for a 1:100 grade of service, and was considerably underloaded for a 1:50 grade of service. The ultimate conclusion to be drawn from these facts depends upon the grade of service to which the observed trunk group TG1 is assigned within the switching system of which it forms a part.

At noted, the pen of pen recorder PR107 normally makes a line 111 at the left of the advancing paper strip 110 thereof. However, when all twenty of the meters CM1 to CM20 are energized at the same time, because all twenty trunks in the group under observation are marked busy at the same time, all twenty of the call-second meters CSM1 to CSM20 are energized at the same time through respective illustrated contacts of the meters CM1 to CM20, thereby closing a chain circuit through the contacts of meters CSM1 to CSM20 in series for energizing the pen-control electromagnet 108 of pen recorder PR107. When that electromagnet is energized, it actuates its pen control structure 109 to cause the pen thereof (not shown) to swing to the right as at point 112 on the tape and to make a mark along the right-hand portion of the tape 110 as long as the all-trunks-busy condition exists. When one or more trunks of the group becomes idle, one or another of the meters CSM1 to CSM20 is deenergized and remains deenergized to indicate that condition, thereby deenergizing magnet 108. The pen recorder thereupon resumes marking line 111 along the left-hand side of the paper, the resumption being as at point 113. All trunks in the observed group may stand busy one or more additional times during the observation period, to make one or another right-side all-busy markings 115. The lengths of all such markings 115 are totalled to give the total period when all trunks are busy.

It will be understood that a pen recorder as commercially available moves the paper tape 110 at a uniform rate and that the paper tape is available which is marked in seconds of elapsed time. Accordingly, the operator of the observation apparatus may observe and total the lengths of all-busy line segments 115 appearing at the right side of the tape during the assumed 15-minute interval of observation. For convenience this total may be multiplied by four and recorded to give the equivalent all-trunks-busy time during an hour. This latter recorder number may be assumed to represent 45 seconds, which is nine seconds more than the 36-second total during an hour that all trunks of a group can be busy without the loss of more than one call in a hundred during that hour. Since 45 is 1.25 times 36, it is evident that the lost-call rate is 1.25 per 100 calls, which is one lost call in 80. If a 1:100 grade of service is assigned to the observed trunk group TG1, the grade of service has deteriorated twenty-five percent. Therefore some of the traffic should be diverted from trunk group TG1, by the usual trunk-connecting techniques, to restore the service to the desired 1:100 grade.

Referring to the relays 101 and 102, spring members 105 and 106 are actuated every six seconds by the raised cam 104 on the 6-second rotary member 103. Each time contact spring 106 is actuated, it completes a circuit for relay 101. Relay 101 removes ground potential from conductor 114 to permit any one of the meters CSM1 to CSM20 operated thereover to restore momentarily, at the same time closing a circuit for relay 102. Relay 102 is slow operating, as by having the indicated copper collar surrounding the armature end of its winding core. Relay 102 operates perhaps fifty milliseconds following the operation of relay 101 which is only slightly in excess of that required for a meter CSM1 to CSM20 to demagnetize and restore its operating armature (not shown) in preparation for reoperation to effect the usual advance of its member wheel structure. Upon operating, relay 102 again grounds conductor 114 and holds it grounded throughout the remainder of the period of the 6-second number 103.

When cam portion 104 again permits spring members 105 and 106 to restore, member 106 open-circuits relay 101, which promptly restores. Upon so doing, it open-circuits the slow-acting relay 102 and makes a further application of ground potential to conductor 114 while relay 102 is still operated. A moment later relay 102 restores, leaving conductor 114 grounded at the contacts of relay 101 until cam member 104 again actuates springs 105 and 106, six seconds later. By this described arrangement for removing ground potential from conductor 114 only momentarily, at six-second intervals, any meter CSM1 to CSM20 whose associated meter CM1 to CM20 is operated is maintained operated very nearly all of the time that its associated CM meter is operated, and is still able to make its desired count of six-second intervals of the busy condition of trunks with which it is associated. Accordingly, when all of the trunks under observation are busy all of the meters CSM1 to CSM20 are operated continuously during the all-trunks-busy interval except for the described momentary restorations thereof at six-second intervals. During an all-trunks-busy condition, each such restoration results in a pip mark on the tape 110, such as that indicated at 115.

It will be understood that the other groups PG2 to PG10 may be observed as described for group TG1. For selection of any such other group for observation, the corresponding one of pushbuttons P2 to P10 is operated in place of P1. In any case, the corresponding one of the lamps L1 to L10 is lighted to inform the observation operator of the arrival of the trunk finder apparatus on the selected trunk group.

It will be further understood that the readings of the meters CM1 to CM20 and CSM1 to CSM20 for each observed trunk group are to be recorded as described, along with the recordal of the total all-trunks-busy time indicated for each observed group by PR107. Assuming that all trunks T1 to T200 are trunks of the same rank and are equivalent trunks, a consideration of the traffic conditions obtaining in all ten trunk groups TG1 to TG10 may show that, while the total number of the trunks is sufficient, some groups are underloaded and some are overloaded. That condition is rectified by the usual techniques of redistributing the traffic to direct less traffic to the overloaded groups and more traffic to the underloaded groups.

It is manifest that the arrangement of FIG. 1 is usable for a group of 100 trunks divided into ten groups TG1 to TG10 of only ten trunks each. In that event, the eleventh to twentieth meters CM11 to CM20 and CSM11 to CSM20 are not used. The only circuit change then required is to move conductor 115 of PR107 from the twentieth meter CSM20 to the corresponding circuit point on the tenth meter CSM10 (not shown), or conductor 115 may be left attached as shown and a jumper may be extended therefrom to the noted circuit point on the tenth CSM10 meter. The traffic data then obtained is related to the information contained in available traffic tables for ten trunks, rather than for twenty. By extension, it is apparent that the arrangement can be used for ten individual groups comprising a smaller number or a larger number than ten, as occasion may require.

FIGS. 2 AND 3.—TRUNK-SCANNING TRAFFIC OBSERVATION

As previously noted, FIGS. 2 and 3 show an organization of circuit apparatus for performing traffic observation on trunks by scanning them successively and repeatedly during a desired observation interval. The apparatus of FIGS. 2 and 3 includes the switch SW200 or FIG. 2, and switches SW300, SW350, and cycle counter C375 of FIG. 3.

In FIG. 2, the switch SW200 is driven by an A.C. motor 204 to rotate the brushes B1 to B6 of SW200 one revolution every 25 seconds, as indicated by the label applied to motor 204. Driving motor 204 is started and stopped by switch S206 which connects the alternating-current supply conductor 205 through the motor to ground over conductor 207 and back contact 3 of relay 36C. It will be observed that brushes B1 and B2 of SW200 are multipled respectively with brushes B3 and B4, and that brush B5 is multipled to brush B6. The contact bank of the switch is of conventional 25-point semicircular construction, with brushes B3, B4, and B6 extended diametrically opposite in direction from the brushes B1, B2, and B5 with the result that one group of brushes is out of contact with the contact bank when the brushes of the other group are traversing it. The full 50-step operation of SW200 thus results from engagement steps 1 to 25 of B1, B2, and B5, and engagement steps 26 to 50 by brushes B3, B4, and B6. For example, conductors 1 to 25 in cable 231 are engaged or scanned in succession through the contacts of brushes B1 and B2 during the first half of a revolution of SW200, with the conductors 26 to 50 in cable 231 being similarly scanned by brushes B3 and B4 during the remaining half of the revolution. At the same time, the ground-connected brush B5 grounds conductors 1 to 25 of cable 233 in succession while brushes B1 and B2 are scanning conductors 1 to 25 in cable 231, and brush B6 grounds conductors 26 to 50 of cable 233 while brushes B3 and B4 are scanning conductors 26 to 30 of cable 231.

The scanned conductors 1 to 50 of cable 231 are connected respectively to the fifty fixed terminals or jack points in multi-point jack 210, wherein the jack points or arranged in five levels of ten points each.

The sleeve or test conductors of trunks to be scanned are plug-connected to the levels of jack points of jack 210. For this purpose five 10-point plugs such as 213 may be used. Plug 113 contains ten plug points or members 1 to 10, and each such plug is plugged into a separate level of jack 210, with its plug points 1 to 10 respectively contacting the ten fixed jack points of the level. A separate 10-conductor cable 214 is connected to each 10-point plug 115, whereby a separate trunk-sleeve conductor can be connected to each jack point in any level of jack 210. The ten conductors in any cable 214 may represent respective trunks of a group of ten trunks or may represent part of a group larger than ten. Five plugs such as 213 connect the test conductors of fifty trunks to the respective conductors 1 to 50 in cable 231.

To facilitate multiple scanning of trunk groups less than fifty during a single revolution of SW200, 50-point jack 211 (similar to 210) is provided, and it has its contact points connected respectively to those of jack 210 by the fifty conductors in multiple cable 232.

The fifty conductors in cable 233 are connected respectively to the fifty contact points of the five-level 50-point jack 212 for control purposes to be described.

It is observed that lamp L20 is connected to point 1 of the first (uppermost) level of jack 212. Accordingly, this lamp is lighted as a pilot indication whenever brushes B1, B2 and B5 are on their respective contacts 1, in the first or starting position of the switch SW200.

In operation, the switch SW200 may be employed along with total-busy meter TBM without the use of any of the apparatus of FIG. 3. In that event, the control switches such as S1 and S301 of FIG. 3 are left unoperated. The scanner SW200, if not already in its No. 1 or starting position, is set in that position by a temporary operation of switch S206 to operate the driving motor 204 until the No. 1 position of SW200 is reached. In that position brushes B1, B2, and B5 are on their respective first bank contacts, and B5 grounds contact 1 of multi-point jack 212 (over conductor 1 of cable 233), thereby lighting lamp L20 as a starting-position signal. Key S206 is thereupon released to disconnect motor 204 and leave SW200 in its starting position. Before motor 204 is restarted, total-busy meter TBM is set into its zero position, or its present reading is recorded as the zero starting point if the meter TBM be not of the readily resettable type.

If the sleeve conductors of the trunks to be scanned are not already connected to the contacts of multi-point jack 210 (by plugs 213 as described) they are now so connected. If the group to be observed contains fifty trunks, for example, five such plugs as 213 are used, one for each of the five levels of contact points of jack 210, thereby connecting the sleeve conductor of a separate one of the fifty trunks to each of the conductors in cable 231, which are encountered successively by brushes B1, B2 and B3, B4 of SW200 during a complete revolution thereof.

Switch S206 is now operated to start motor 204, which causes the brushes B1 to B6 of SW200 to make a complete revolution every 25 seconds, and S206 is left operated during the desired observation interval, such as 15 minutes. It will be observed that the odd-numbered ones of the test conductors 1 to 25 in cable 231 are encountered only on odd-numbered positions of brushes B1 and B3 of SW200, while the even-numbered conductors of cable 231 are encountered on alternate and interspersed even-numbered positions of brushes B2 and B4. During the first twenty-five steps of SW200, brush B5 grounds successive conductors 1 to 25 in cable 233, while the associated brush B6 grounds the conductors 26 to 50 in cable 233 during the second twenty-five steps of SW200.

Each time brush B1 or brush B3 of SW200 encounters a busy-indicating ground potential on an odd-numbered one of the conductors 1 to 50 in cable 231 (representing an in-use condition of the trunk whose sleeve conductor is represented by the encountered grounded conductor), odd relay 201 is energized through back contact 3 of even relay 202. Back contact 3 of relay 201 thereupon disconnects relay 202 as a part of the circuit structure for insuring proper spacing between successive busy-indicating pulses; contacts 1 of relay 201 ground busy-pulse conductor 224 through contacts 1 of relays 202 and 203, but that conductor is not used when the apparatus of FIG. 3 is not being operated, as now. Contacts 2 of relay 201 close a circuit through contacts 2 of relays 202 and 203 for the total-busy meter TBM, thereby energizing that meter to advance its associated number-indicating structure one step. At the same time relay 203 is energized through contacts 2 of relays 201 and 202. Its contacts 1 and 2 disconnect conductor 224 and the winding of TBM from ground. This disconnecting operation occurs at the end of a sufficient energizing interval, thereby providing ample time for the magnet of TBM to deenergize in preparation for again operating its number-wheel apparatus on the next busy-indicating pulse.

As soon as the switch SW200 has stepped off the contact over which relay 201 was operated, relay 201 restores, permitting pulse-length relay 203 to restore. With relay 201 restored, relay 202 is reconnected at contacts 3 of 201 for operation over the currently acting one of the brushes B2 and B4.

Each time brush B2 or B4 of SW200 encounters a busy-indicating ground potential on an even-numbered conductor in cable 231, even relay 202 is operated through back contact 3 of odd relay 201. At its contacts 3, relay 202 disconnects odd relay 201 to preclude concurrent operation of both relays, and at its contacts 1 and 2, it grounds conductor 224 and energizes the electromagnet of TBM for the short interval required for pulse-length relay 203 to operate as described. Thereupon the electromagnet of TBM is deenergized as described.

When the brushes of SW200 pass to the next contact set, the consequent ungrounding of brush B2 or B4 open-circuits and restores even relay 202, whereupon pulse-length relay 203 restores as described. At the end of the assumed 15-minute period of observation, switch S206 is restored, thereby stopping the brushes B1 to B6, preferably in their illustrated first or starting position, wherein lamp L20 is lighted through brush B5. It may be noted that a convenient use to be made of lamp L20 is to count the revolutions of switch SW200 during an observation period, ignoring the initial lighting of the lamp and counting the ones which occur thereafter, restoring key S206 upon the fifteenth relighting of lamp L20.

When the scanning period is ended as described, the reading of meter TBM is recorded as a record of the number of busy conditions encountered during the thirty-six scannings of the trunk group under observation, which number can be divided by thirty-six to show the average number of trunks found busy during any one of the thirty-six 25-second scanning cycles performed by SW200.

When a comparatively small trunk group, say a group of ten or a group of twenty, is to be observed by the described action of SW200 and TBM substantially as described, the rate at which the trunks of the group are scanned may be increased without changing the speed of operation of SW200, by multipling contact levels together at multiple jack 211, the contact points of which are connected respectively to the contact points of jack 210 by cable 232, as previously described. For example, if the group under observation contains only ten trunks, their test conductors may be connected to the first level of contacts of jack 210 (and conductors 1 to 10 of cables 231 and 232) by a cable 214 and a 10-point plug 213. Additionally, the five plugs 213A to 213E (FIG. 2A) are connected respectively to the five levels of contact points of the multipled jack 211. When this is done, multiple cables 241 to 244 connect the sleeve conductors of the ten trunks under observation to the second to fifth levels of jacks 211 and 210 thereby connecting them in multiple to conductors 11 to 20, 21 to 30, 31 to 40, and 41 to 50 of cable 231. Under this multipled condition, the ten trunks under observation are scanned five times during each revolution of SW200. The time required for thirty-six scannings of the trunk group under observation is thus reduced to one-fifth of the time required for scanning a non-multipled trunk group, that is from 15 minutes to three minutes. At this time, each flash of lamp L20 represents five scannings of the ten trunks. For scanning-time purposes, thirty-six scannings have occurred when the scanning period extends five seconds beyond the fifth flash of lamp L20.

During the ten-trunk scanning operation, the trunks-busy meter TBM is operated as described to show the total number of busy trunks encountered, and its reading at the end of the 3-minute scanning period is recorded. This recorded reading may be divided by thirty-six to show the approximate average number of trunks of the group of ten which were found busy during one scanning thereof.

In FIG. 2B, showing a multipled 10-point plug pair, the terminal members (or plug points) 1 to 10 of plugs 213F and 213G are interconnected by the conductors 1 to 10 in cable 245. Plug 213F is shown in front view as are plugs 213 and 213A to 213E, while plug 213G is shown in top view. If, for example, a twenty-trunk group is to be scanned as described by the use of switch SW200, the twenty test conductors of the trunks of this group may be connected to the first and second levels of jack 210 by a pair of cables such as 214 and a pair of 10-point plugs such as 213, thereby connecting these test conductors to conductors 1 to 20 of cable 231. Double scanning of these twenty trunks may be secured by the use of two of the multipled plug pairs shown in FIG. 2B. The plugs of the first pair are inserted in levels 1 and 3 of jack 211 to provide second scanning (over conductors 21 to 30 of cable 231) of the first ten trunks, and the plugs of the second pair are inserted into levels 2 and 4 of jack 211 to provide second scanning (over conductors 31 to 40 of cable 231) of the second ten trunks. Under the described double-scanning condition, the twenty trunks of the group under observation are scanned first by switch SW200 over conductors 1 to 20 in cable 231, and these same conductors are scanned again, during the same revolution of SW200, over conductors 21 to 40 of cable 231. Conductors 41 to 50 of cable 231 are unused in this example. By the time switch SW200 has made eighteen revolutions (requiring seven and one-half minutes), the 20-trunk group, therefore, has been scanned thirty-six times, wherefore key S206 can be restored to terminate the 36-cycle scanning action upon the eighteenth lighting of lamp L20 after the scanning has been started.

The number of operations of meter TBM (controlled as described by relays 201 to 203), occurring during the described scanning of the 20-trunk group may be recorded, and that number may be divided by thirty-six to show the average number of trunks found busy during a single scanning thereof.

MULTI-GROUP SCANNING—SWITCHES SW200 AND SW350

Switches SW200 of FIG. 2 and SW350 of FIG. 3 may be used together when a plurality of groups of trunks are to be scanned in succession during the same observation period. For example, if five 10-trunk groups are to be scanned, they may be connected each by a separate cable 214 and a separate plug 213 to the respective ones of the five levels of jack 210. The conductors 1 to 50 in cable 231 are thereby each connected to a separate one of the fifty busy-test conductors of the total of fifty trunks of the five ten-trunk groups. Preferably, this occurs with switch SW200 in its position 1, wherein start lamp L20 is lighted.

Switch SW350 is a 3-brush 11-point group-meter switch, having brushes B1 to B3 which are normally standing on the eleventh or home-position contacts, indicated at H. Switch S302 is operated to connect conductors 224 and 313 to conductors 315 and 316 of SW350. Since the trunks now to be scanned comprise five groups (fifty trunks in five groups of ten), each of the switches S1 to S5 is operated to connect group-pulse conductor 330 to terminals 10, 20, 30, 40, and 50 of jack 212, and switches SK1 to SK5 are operated to disconnect stepping ground from contacts 1 to 5 of brush B2 of SW350. Start switch S306 for SW350 is now operated, grounding contact H of brush B2 of SW350 over conductor 317, thereby closing a self-interrupting circuit for motor magnet 320 of SW350, to drive the brushes B1 to B3 thereof from home position H to position 1.

Following the described preparatory operations, start switch S206 is closed to actuate motor 204 of SW20, to start the scanning period, of thirty-six scanning cycles, for example.

During the scanning operation, each time either of the relays 201 or 202 operates as described, totalizing meter TBM is actuated as described, and a momentary busy trunk pulse is placed on busy-pulse lead 224, thereby extending a momentary ground pulse through contacts 1 of S302, and over conductor 315, to brush B1 of switch SW350. Brush B1 of SW350, therefore, receives as many pulses as are delivered to TBM. Initially switch SW350 is standing in position 1 as described, wherefore the busy-trunk pulses received by its brush B1 while the first ten-trunk group is being scanned are delivered over conductor 1 of cable 341 to the first group meter GM1 to which it is connected through terminal 1 of group 318.

During the scanning of the tenth trunk in the first group, the brushes of SW200 are in position ten, on the tenth contact set thereof, wherein brush B5 of SW200 places ground on the tenth conductor in cable 233, connected to terminal 10 of jack 212. A group-end pulse is accordingly transmitted through contacts of the operated switch S1 to conductor 330, thereby closing a group-end stepping circuit through contacts of pulse-cutoff relay 301, over conductor 313, contacts 2 of switch S302, and conductor 316, to motor magnet 320 of switch SW350. Motor magnet 320 thereupon operates preparatory to advancing the associated brushes B1 to B3. A slight interval later, relay 301 operates and disconnects the group-end pulse from conductor 313, permitting motor magnet 320 to deenergize and advance its brushes B1 to B3 onto the second contact set thereof. Accordingly, during the interval when the trunks of the second group are being scanned, the pulses received (over conductors 224 and 315) by brush B1 are extended over conductor 2 in cable 341 to operate the second group meter GM2 (similar to GM1 to GM10, but not shown) to record the number of trunks found busy in the second group of ten trunks.

As the operation proceeds, switch SW350 receives a further group-end stepping pulse from each of the jack points 20, 30, 40, and 50 of jack 212 through switches S2 to S5. Accordingly, switch S350 is advanced one step for each ten-trunk group scanned, whereby busy-pulse brush B1 of SW350 is standing on a separate one of the group meters GM1 to GM5 (GM2 to GM5 not shown) for each ten-trunk group scanned during a revolution of SW200, wherefore each such group meter GM records the number of busy trunks encountered in its corresponding ten-trunk group.

When the fifth noted group-end pulse is received by motor magnet 320 of SW350, with brushes B1 to B3 standing on their fifth set of contacts, the ensuing step of brushes B1 to B3 advances them to their sixth set of contacts. Contacts 6 to 10 in the bank of brush B3 of switch SW350 are grounded over conductors 6 to 10 in cable 342, and contacts of switches SK6 to SK10 and contact H is grounded by contacts 2 of switch S306, wherefore brush B2 encounters ground potential in positions 6 to 10 and H of the switch. Stepping magnet SW350 is thereby caused to buzz B1 to B3 rapidly to and through home position H of SW350 to arrive again in position 1 in readiness for the start of the second cycle of scanning operations with the arrival again of switch SW200 in its initial position.

The described operations of switch SW350 are repeated during each of the succeeding ones of the thirty-six assumed scanning operations of SW200.

When the assumed 15-minute scanning interval (thirty-six scanning cycles) is over, and key S206 has been restored to terminate the operation of switch SW200 as described, keys and switches of FIG. 3, S1 to S5, SK1 to SK5, S302, and S306, may be restored. Contacts 1 to 10 of B2 of SW350 are grounded by SK1 to SK50, whereupon switch SW350 buzzes to and remains in home position since switch S306 is restored.

The reading of TBM may now be recorded and divided by 36 to show the average number of the fifty trunks found busy during a single scanning thereof. Also, the readings of group meters GM1 to GM5 (GM2 to GM5 not shown) may be recorded and each reading may be divided by 36 to show the average number of busy trunks found in the corresponding group of ten trunks during a scanning thereof.

Smaller numbers of trunk groups than five can be scanned as described and have their total number of encountered busy trunks recorded on separate ones of the group meters controlled through brush B1 of SW350. For example, three ten-trunk groups may be connected to levels 1, 3, and 5 of jack 210. In this event, keys S1, S3, and S5 are operated to provide group-end pulses from points 10, 30, and 50 of jack 212. Also, SK1, SK3, and SK5 are operated to unground contacts 1, 3, and 5 in the bank of homing brush B2 of SW350. Accordingly, the busy trunks encountered during the ensuing thirty-six scanning operations are recorded on the first, third, and fifth of the group meters GM1 to GM10, and SW350 is again buzzed to its home position on the restoration of switches S206, S302, S306, S1, S3, and S5.

As a further example of multi-group scanning, two 20-trunk groups may be presented to SW200, by plugging the sleeve conductors of the first 20-trunk group into levels 1 and 2, for example, of jack 210, and plugging the second 20-trunk group into levels 4 and 5, for example, of jack 210. The switches of FIG. 3 then to be operated, along with S302 and S306, may be S2, S5, and SK1, and SK2. Switch SW350, on being operated to position 1 by start switch S306, stays in that position until the twenty trunks of the first group have been scanned, whereupon it receives a group-end stepping pulse through switch S2 which drives it to position 2, where it remains while the second 20-trunk group is being scanned. In position 50 of SW200, a group-end pulse is delivered through switch S5 to step SW350 to position 3, from which it buzzes to position 10 (since SK3 to SK10 are not operated) whence it buzzes to and through position H to reach position 1 again, in readiness for the second scanning cycle. As the scanning cycles occur, the trunks-busy pulses for the first and the second 20-trunk groups are delivered by B1 of SW350 to the first and second group meters GM1 and GM2 respectively. When the thirty-sixth scanning cycle has occurred, switches S206, S302, S306, S2, S5, SK1, and SK2 are restored, terminating the scanning operation with SW200 in position 1, and causing SW350 to buzz to position H as described.

When a trunk group being scanned contains a number of trunks less than ten, for example, the corresponding group end switch such as S1, for example, may be plugged into a contact in its associated level of jack 212 other than contact 10 of the level. For this purpose, each switch S1 to S5 has a separate flexible conductor 223, terminating in a separate single-point plug 222. Any plug 222 may be plugged into any contact 1 to 10 of its contact level of jack 212.

When desired, during operations as described of switches SW200 and SW350, the multiple pen register PR307 may be used in combination with stepping switch SW300 to record the total number of busy trunks encountered during a described series (thirty-six) of revolutions of scanning switch SW200. For this purpose, switches S301, S303, and S304 are operated in addition to switches S302 and S306 and the required ones of switches S1 to S5 and SK1 to SK5 are also operated.

The recording tape (not shown) of pen recorder PR307 is also started into operation in the usual manner, whereupon each of its pens UC1 to UC9, TC, and CC, starts to draw an ink line thereon.

During the observation period, started as described by the actuation of start switch S206 to drive switch SW200, on the encountering of each busy one of the trunk's observed, an impulse is delivered over conductor 224 and thence to brush B1 of SW350, incidental to the described operation of the group meters including GM1. With switch S303 operated, each such busy trunk pulse on conductor 224 is delivered through contacts 1 of switch S303, and contacts 1 of relay 303, to motor magnet 306 of SW300. Motor magnet 306 is accordingly energized on each such busy-trunk pulse, to advance the associated brushes B1 to B3 one step for each busy trunk encountered during the current observation period.

When SW300 is stepped into its first position, brush B2 thereof completes an operating circuit for relay 305, from ground through back contact 2 of relay 303, switch S304, contact 3 of relay 304 to brush B2, and thence through contact 1 of brush B2, to the winding of relay 305. At its contact 2, relay 305 closes a self-locking circuit in shunt of brush B2 of the switch and its first contact, and at its contact 3 it grounds home contact H in the bank of brush B3 to cause the switch to advance self-interruptedly through home position thereafter.

Since brush B1 of SW300 is not grounded during the scanning operation in progress, none of the pen magnets of units pen recorders UC1 to UC9 is energized as SW300 is stepped over its contact sets 1 to 9 to which they are connected. However, each time SW300 reaches its tenth contact set (on a count of ten busy-trunk pulses), the ground standing on its brush B2 (contacts 2 of relay 303, switch S304, and back contact 3 of relay 304) closes a circuit for energizing the magnet of the tens recording pen TC, which makes a substantial deflection in the noted mark which that pen is drawing along the paper tape or other recording medium (not shown) of PR307. That deflection shows that ten (or an additional ten) busy-trunk pulses have been received over conductor 214 by motor magnet 306, and it endures until SW300 has been stepped again, as by the eleventh busy pulse.

Each time SW300 is stepped from its tenth position into its home position, ground through contacts 3 of relay 305 is encountered by brush B3, causing SW300 to be immediately advanced from home position to reach position 1 again.

When the scanning operation in progress is terminated, switches S302 and S305 are restored, and switch S206 is restored to stop the action of switch SW200. Also, any operated ones of switches S1 to S5 are restored, along with any operated ones of switches SK1 to SK5, thereby causing switch SW350 to advance self-interruptedly as described to reach and remain in its home position H. Switch S301 is now temporarily operated. When this occurs, relay 302 is operated from ground on brush B3 of SW350, contact H of B3, contact 1 of the restored switch S305, and the alternate contact 2 of the temporarily operated switch S301. Contacts 1 of relay 302 close a circuit over conductor 311 and through contacts 2 of switch S303 for operating relay 303, at the same time grounding brush B1 of SW300 through contacts 1 of the locked-operated relay 305. The ground potential on B1 of SW300 energizes one or another of the pen magnets of units pens UC1 to UC9 if the count of the encountered busy trunks is anything other than ten or an even multiple of ten. It may be assumed that the brushes of SW300 are standing in position 6, in which case the ground on brush B1 of the switch energizes the magnet of the sixth units pen UC6, thereby causing a mark deflection to be made by the pen UC6 to show that the units digit of the number of busy trunks encountered is the digit 6. If it be assumed that twenty-one tens marks have been made by the tens pen TC as described, the total number of busy trunks encountered is shown by the tens and units marks to be 216.

Relay 303 is energized by the ground potential delivered to its winding through contacts 1 of relay 302 as described. At its contacts 2, it disconnects and restores relay 305, at the same time operating homing-control relay 304 through its upper winding. At its contacts 4, relay 304 grounds contacts 1 to 10 in the bank of homing brush B3, and at its contacts 2 it locks to ground on brush B3 until SW300 has homed. Relays 302 and 303 may now be permitted to restore to initiate restoration of SW300 (by restoration of switch S301), leaving homing-control relay 304 locked operated until homing is completed. The ground placed on bank contacts 1 to 10 of brush B3, by contacts 4 of relay 304, closes a circuit over brush B3 and through the self-interrupting contacts of motor magnet 306 for the said magnet, causing magnet 306 to operate in a buzzer-like manner until the associated brushes B1 to B3 are driven to their home position H, whereupon magnet 306 stops operating (relay 305 having been restored), and relay 304 restores since there is no longer holding ground on brush B3.

Cycle counter C375 of FIG. 3 may be employed along with switches SW200, SW300, and SW350 when an arrangement is desired which terminates the scanning operation of the selected trunk group precisely upon the termination of a predetermined number of scanning operations of the switch SW200. As illustrated, counter C375 is arranged, in cooperation with SW300 and relays 303 to 305, to terminate the scanning operation upon a count of thirty-six scanning operations of SW200.

When C375 is to be used, the switches operated preparatory starting SW200 are switches S301, S302, S304, S305, and S307. It should be noted that S303 is left restored for this arrangement for automatically terminating the scanning operation.

Switch S206 is now operated to start the described scanning operations of SW200. The pulses on conductor 224 representative of respective busy ones of the scanned trunks again pass through contacts 1 of S302 to brush B1 of SW350 as described to cause the totals for the scanned trunk groups to be recorded on respective ones of the group meters such as GM1, but these pulses do not reach SW300 since switch S303 is left restored.

Upon the completion of the scanning of each separate trunk group currently accessible to SW200, a pulse is delivered over conductor 313 and contacts 2 of S302 to actuate the motor magnet 320 to step switch SW350 as described, causing the described step-by-step advance of SW350 over the associated group meters to occur. When the first scanning operation of all trunk groups has been completed by SW200, group meter switch SW350 is advanced to and through its home position H as described, to reach its position 1 again in readiness for the next cycle of scanning operations.

At the end of each scanning cycle, when SW350 is advanced to and through its home position H, its brush B3 momentarily grounds cycle-end conductor 314. With switch S305 operated, a circuit is hereby closed through contact 2 of S305, and through contact 1 of relay 303 for operating motor magnet 306 of SW300. The brushes of SW300 are accordingly advanced one step at the end of each scanning cycle. The first advance, it will be recalled, is from position H to position 1. Thereupon, relay 305 operates and locks as described to secure automatic advance thereafter of SW300 through position H.

On the completion of the tenth scanning cycle, SW300 is advanced from position 9 to position 10, whereupon the magnet of tens pen TC is energized from ground on brush B2 of SW300, placed there through back contact 2 of relay 303, SW304, and back contact 3 of relay 304. Pen TC accordingly marks the end of the tenth scanning cycle. With S307 operated, a pulse circuit for counter C375 is now completed from ground over conductor 324, and contacts 4 of S307 to pulse conductor 328. This 10-cycle pulse passes from conductor 328, through back contacts of counting relays 333, 332, and 331, to the junction of the windings of counting relay 331, thereby energizing the low-efficiency right-hand winding of this counting relay. Through this winding, the relay is energized just sufficiently to close its lightly adjusted contacts 1, but insufficiently to actuate its remaining contacts. Relays 332 and 33 are similar 2-step relays. Contacts 1 of relay 331 close a locking circuit for both windings of the relay in series to ground at contacts 1 of relay 334, but relay 331 does not respond immediately to the closure of this locking circuit, since the efficient left-hand winding of 331 thereof is short-circuited over the traced pulse circuit. But, when the actuating pulse on conductor 328 ends (25 seconds later at the end of the next scanning cycle, when the 11th-cycle step of SW300 occurs), relay 331 is operated fully over its locking circuit (both windings in series), and transfers pulse conductor 328 from its own windings to the windings of the second counting relay 332.

At the end of the twentieth scanning cycle, TC is again operated and a counting pulse is again transmitted over conductor 328, this time passing through front contact 2 of the operated 10-cycle relay 331 to the windings of 20-cycle relay 332. Relay 332 thereupon operates through its first step (closure of its contacts 1) and operates fully on the later termination of its operating pulse to transfer pulse conductor 328 to the windings of relay 333.

At the end of the thirtieth scanning cycle, pen TC is again operated, and the 10-cycle pulse received coincidentally over conductor 328 reaches the windings of 30-cycle relay 33 through front contact 2 of the operated relay 332. Thirty-cycle relay 333 thereupon operates through its first step (closing its locking contacts 2), and it operates fully at the termination of its operating pulse to actuate its contacts 1 and 3. Contacts 3 of relay 333 disconnect pulse conductor 328, and its contacts 1 join conductors 330 and 332 to prepare a circuit for relay 303.

On the next six cycle-end pulses received by stepping magnet 306, switch SW300 operates as described to advance its brushes B1 to B3 through position H and through positions 1 to 5 to reach position 6. Thereupon brush B2 of SW300 (grounded as described) grounds conductor 323, closing a circuit through contacts 2 of switch S307, contacts 1 of the 30-cycle counting relay 333, and conductor 322, for operating relay 303. A branch of this circuit extends through contacts 1 of relay 305 to ground brush B1, thereby operating the sixth units recording pen UC6, which marks the fact of the completion of the 36th scanning cycle of the trunks being observed.

On the described operation of relay 303, its back contact 2 open-circuits and restores relay 305 to prepare for the homing action of SW300, and its front contact 2 grounds conductor 325, to operate relay 304 through its upper winding, causing SW300 to home as described.

The described grounding of conductor 325 also closes an operating circuit for 36-cycle relay 334 through contacts 5 of switch S307, and over conductor 328 to the right-hand winding of relay 334. Contacts 2 of relay 334 lock relay 334 to ground through contacts 1 of relay 335 and contacts 3 of switch S307, and contacts 1 of relay 334 remove holding ground from relays 331 to 333, whereupon these relays immediately restore. Contacts 4 of relay 334 disconnect pilot conductor 352; its front contact 3 grounds pilot conductor 351; and its back contact 3 open-circuits the drive motor 204 of SW200 by ungrounding conductor 207. The scanning operation is thereby stopped upon the completion of thirty-six scanning cycles.

If desired, an additional group of 36 scannings of the same trunks may be carried out merely by temporarily actuating switch 306 to temporarily operate relay 335. Thereupon, relay 334 is unlocked and restored, whereupon its back contact 3 again completes the circuit of motor 204 of scanning switch SW200. In the usual case, however, while relay 334 is still operated, the trunks last scanned are disconnected from jack 210 associated with switch SW200, and are replaced by the next group of trunks to be scanned. Also, the switches S1 to S5 are rearranged as necessary to accord with the grouping of the trunks about to be scanned, and the switches ST1 to ST5 are likewise rearranged as necessary to accord with the number of trunk groups now about to be scanned.

When the scanning operation is resumed responsive to the described restoration of relay 334 on a temporary energization of relay 335 by S308, the scanning operation proceeds as described. That is, switch SW350 is initially standing in first position and there remains to direct the busy count of scanned trunks to meter GM1 until advanced over conductors 311 and 316 on the termination of the scanning of the first trunk group, whereupon SW350 is advanced as described. At the switch SW300, relay 305 is operated as described when the brushes B1 and B3 are advanced from home position to position 1 at the termination of the first scanning cycle, with succeeding operations occurring as described to culminate again in the described operation of 36-cycle relay 334 and in the described restoration of switch SW300 to home position.

When all of the trunks which are to be scanned as described have been scanned, the observation operator may restore key 206 to preclude further operation of motor 204 of SW200 for the time being; restore switch S307 to disconnect counter C375, whereupon locked 36-cycle relay 334 is restored by contacts 3 of S307; restore any operated ones of switches S302 to S306 along with any operated ones of the switches S1 to S5 and any operated ones of the switches SK1 to SK5, whereupon SW350 is buzzed to its home position H as described leaving the apparatus of FIGS. 2 and 3 quiescent for the time being.

FIGS. 2 TO 5.—COMPLETE SYSTEM

For an understanding of the complete system of FIGS. 2 to 5, FIGS. 2 to 5 should be arranged as shown in FIG. 6, with stepping conductor 416 to FIG. 4 aligned with its extension on FIGS. 2 and 3.

The trunk-finder apparatus of FIG. 5 comprises switches 1F1, 1F2, and 1FC, which may be collectively termed a group finder, with the complete system including ten such group finders of which only the first is shown. The presence of the other nine group finders in the system is indicated in FIG. 5 by the label "To Other Finders" and the labels "To 2FC–10FC." These labels refer to cables 410, 413–415, 511, and 512. Each of these cables contains ten conductors. While all ten conductors in each of the cables 410, 413, 511, and 510 multiply to ten corresponding points in all ten finders indicated in FIG. 5, the conductors 1 to 10 in each of the cables 414 and 415 connect individually to the ten finders respectively.

The 11-position finder selector FS of FIG. 4 is provided in common for the ten finders, of which the first one is shown in FIG. 5. FS has three brushes B1 to B3, which may be advanced to any one of eleven positions, comprising the normal or home position H and ten finder-selecting positions 1 to 10.

Each of the switches 1F1, 1F2, and 1FC of FIG. 5 is also an 11-position switch, each having a home position H and ten selecting positions 1 to 10. Each of the finders 1F1 and 1F2 has ten brushes B1 to B10, and the finder controller FC has two brushes B1 and B2. The switchboard keys FS1 to FS10 of FIG. 4, together with the respectively corresponding signal lamps 1 to 10 of group 401, correspond respectively to the ten finders, of which the first is shown in FIG. 5, and keys LS1 to LS10, together with lamps 1 to 10 of group 402 correspond respectively to the levels L1 to L10 of jacks 521 and 522.

The one hundred bank contacts encountered ten at a time in positions 1 to 10 by brushes B1 to B10 of finder switch 1F1 are multiplied point-for-point over cable 531 with the one hundred points of the ten-level jack 521, having ten 10-point levels L1 to L10. Similarly, the one hundred bank contacts of positions 1 to 10 of finder switch 1F2 are multiplied point-for-point over cable 532 with the one hundred points of jack 522, comprising ten 10-point levels L1 to L10. Jacks 521 and 522 are arranged to receive 10-point plugs such as 523 and 524 to which the sleeve conductors of trunks in groups of ten are connected by cables such as 525 to 528. These cables and 10-point jacks are provided in any number desired, such as 20.

SINGLE 20-TRUNK GROUP

If the structure of FIGS. 2 and 3 is to be used in cooperation with the structure of FIGS. 4 and 5, for scanning a 20-trunk group of trunks whose sleeve conductors are connected to level L1 of jacks 521 and 522 by plugs 523 and 524, plugs 513 and 514 of cables 511 and 512 of FIG. 5 may be inserted into the first and second contact levels of jack 210 of FIG. 2. Thereby, the brushes B1 to B10 of 1F1 and B1 to B10 of 1F2 are connected to the first and third levels, respectively, of jack 210 to provide for the scanning of the twenty trunks of the group in positions 1 to 10 and 21 to 30 of scanning switch S200. For a repeated scanning of these trunks during the same rotation of SW200, a pair of plugs such as 213F and 213G (FIG. 2B) may now be inserted into the first and second contact levels of jacks 211 to multiple the first ten scanning points of SW200 to the second ten scanning points thereof by way of their cable 245. Also, the plugs of a further similar pair may be inserted into the third and fourth levels of jack 211 to multiple the third ten and the fourth ten scanning points of SW200 together.

For a recording of the busy trunks encountered within the first ten trunks and separately for those encountered within the second ten trunks, as well as a count of the scanning cycles, switches S2 and S4 of FIG. 3 are now operated to connect the group end pulse conductor 330 to points 20 and 40 of jack 212, representing the 20th and 40th trunk-scanning points of switch SW200. Switches SK1 and SK2 are now operated to remove ground from positions 1 and 2 of brush B2 of SW350 in preparation for directing the trunks-busy pulses received at brush B1 to the first two of the ten meters GM1 to GM10.

Additionally, switches S301, 302, 304, and 307 are operated to prepare for the counting of thirty-six scanning cycles. Switch 306 is also operated to ground conductor 317, thereby advancing brushes B1 to B3 of SW350 from home position H to first position 1, wherein the first group meter GM1 is selected by brush B1.

In the control turret of FIG. 4, the first finder selecting FS1 is actuated to select the first group finder, shown in FIG. 5. It does this by ungrounding conductor 1 in cable 411, which ungrounds contact point 1 of brush B3 of finder selector FS. Switch FS1 also grounds conductor 421, common to the keys FS1 to FS10. The home contact H in the bank of brush B3 of FS is thereby grounded, closing an operating circuit for motor magnet 403 through brush B3 and the self-interrupting contacts of the motor magnet. Motor magnet 403 accordingly operates and opens its own circuit to thereupon restore. Upon so doing, it advances the associated brushes B1 to B3 from home position H to first position 1, in which position the advance is stopped because of the described ungrounding operation of key FS1.

With the twenty trunks to be scanned now connected to level L1 of jacks 521 and 522 by plugs 523 and 524 as described, the level-selecting key LS1 is now operated, thereby ungrounding conductor 1 in cable 413 to select position 1 of 1FC. Key LS1 also grounds brush B2 of 1FC (connected in common to LS1 to LS10). With finder selector FS in position 1 as described, the grounding of its brush B2 grounds conductor 1 in cable 414, thereby grounding home contact H of brush B2 of 1FC. A circuit is thereby closed through contacts of motor magnet 501, which operates magnet 502. The latter magnet operates magnet 503. Magnet 503 open-circuits magnet 501, whereupon magnets 501 to 503 restore in swift succession, advancing the brushes 1F1, 1F2, and 1FC from home position H to first position 1, wherein the brushes of these switches remain for the time being, since contact 1 of brush B2 of FC is standing on the ungrounded conductor 1 in cable 413.

Switch S206 is now operated to close a circuit for motor 204 over conductor 207 and back contact 3 of relay 334. Responsive thereto, the switch SW200 proceeds to scan the fifty conductors in cable 231 as hereinbefore described, preferably starting in position 1 wherein lamp L20 lighted, as described.

During the first ten, and again during the second ten, scanning steps of SW200, the brushes B1 and B2 scan conductors in cable 231 which are connected to jack points 1 to 10 of jack 210, the ten points of plugs 573, the conductors in cable 511, the brushes B1 to B10 of 1F1 (FIG. 5) standing in position 1, the conductors 1 to 10 in cable 531, jack points 1 to 10 in level L1 of jack 521, which are connected by plug 523 to the ten trunk-test conductors contained in cable 525 to respectively represent the first ten trunks of the twenty to be scanned. During the third ten, and again during the fourth ten steps of SW200, conductors are scanned which are similarly connected through brushes B1 to B10 of 1F2 (FIG. 5) to the test conductors of the second ten of the trunks to be scanned.

When the double scanning of the first ten trunks of the group has been completed, on the twentieth step of SW200, the twentieth conductor in cable 233 is grounded by brush B5 of SW200, thereby extending a group-end ground pulse through the twentieth contact point of jack 212, through switch S2, and through contacts of relay 301 to group-end conductor 313, whence it extends through contacts 2 of switch S302 to stepping magnet 320 of SW350, to cause that switch to advance from its first set to its second set of contacts, to connect the second group meter GM2 (not shown) in place of the first one.

When the double scanning of the second ten trunks of the group has been completed, a further group-end pulse is transmitted to motor magnet 320 of SW350, through switch S4, and conductors 313 and 316, to cause SW350 to advance again, this time through positions 3 to 10 and H, back to position 1, wherein GM1 is again selected.

Each time SW300 passes through its position H, it momentarily grounds conductor 314 to close the described cycle-count stepping circuit of motor magnet 306 of SW200, way of contact 2 of switch S305, and contact 1 of relay 303. Accordingly, SW200 and C375 operate as described to count thirty-six cycles of SW350, to terminate the scanning operation on the described operation of 36-cycle relay 334. Thereupon, switch SW200 is stopped in position 1 as described, and lamp L20 is operated as a signal that the scanning operation has been completed.

Since the twenty trunks have each been scanned twice as described during each revolution of switch SW200, the total reading of TBM should be divided by 72 to obtain the average number found busy in the 20-trunk group. Moreover, considering the first ten trunks as group 1 and the second ten trunks as group 2, the readings of group meters GM1 and GM2 should each be divided by 72 for the same reason.

SCANNING TWO 20-TRUNK GROUPS

If two twenty-trunk groups are to be scanned, for example, switch S450 is restored to connect conductor 316 to brush B3 of finder selector FS, whereby that brush is grounded momentarily on each delivery of a group-end pulse to the motor magnet 320 of group meter switch SW320; plugs 513 and 514 are plugged in to the first and second levels of jack 210; levels 1 and 2 of jack 210 are multipled to levels 3 and 4 of that jack, by plug pairs of FIG. 2B between levels 1 and 3, and between levels 2 and 4, of jack 211; the first 20-trunk group is plugged in to level L1 of jacks 521 and 522, as by plugs 523 and 524; and the second 20-trunk group is plugged in to level L2 of jacks 521 and 522 by a similar pair of plugs. In this situation level-selecting keys LS1 and LS2 are both operated along with FS1, whereby positions 1 and 2 of the first finder are selected, and 1F1, 1F2, and 1FC are driven to position 1 as described in readiness for the start of scanning.

At the end of the scanning of the first 20-trunk group, the described group end pulse over conductor 316 passes also through restored switch S450, brush B3 of FS, contact 1 thereof, and conductor 1 of cable 415 to magnet 501, causing magnets 501 to 503 to drive the switches of FIG. 5 to position 2 to select the second trunk group.

During the scanning steps 21 to 40 of SW200, the conductors scanned are conductors 21 to 40 in cable 231. These conductors are now connected, through levels 3 and 4 of multiple jack 211 to the respective jack points in levels 1 and 2 of 210 and 211 by the use of two pairs of level multipling plugs (FIG. 2B) as described. Thereby, the same twenty conductors represented by plugs 513 and 514 in cables 511 and 512, as well as brushes B1 to B10 of 1F1 and 1F2, are scanned again. At this time, however, these twenty conductors are connected to the second position contacts of 1F1 and 1F2 because of the described advance of the switches 1F1, 1F2, and 1FC on the twentieth step of SW200. Accordingly, the trunk sleeve conductors now scanned are those connected with the second level of contacts of 1F1 and 1F2, multipled respectively to the contacts of the second level L2 of jacks 521 and 522 as described and extended thence over trunk cables such as 527 and 528, connected to the plugs inserted into level L2 of jacks 521 and 522 as described.

When the scanning of the second twenty trunks has been performed, that fact is signalled by ground from brush B6 of SW200 being extended over conductor 40 of cable 233 to the tenth contact point in the fourth level of jack 212, thereby transmitting a further group-end pulse through switch S4 to conductor 316, whence it proceeds as described to operate stepping magnet 320 of SW350 to advance SW350 from its second position to its third position. SW350 thereupon buzzes as described to return to position 1 because of the restored condition of keys SK3 to SK10. At the same time, with S450 restored, the group-end ground pulse is transmitted over the described path to momentarily energize magnet 501, to cause 501 to 503 to advance their respective switches from position 2 to position 3. Since keys LS3 to LS10 are all restored, brush B3 of 1FC encounters ground in positions 3 to 10, causing 1F1, 1F2, and 1FC to advance rapidly to and through position H and reach position 1 again. The actions of the switches of FIG. 5 are repeated for each of the thirty-six pairs of group-end pulses received over conductor 316, as are the described actions of SW350.

The items SW340 and C375 of FIG. 3 act as described to count thirty-six scanning cycles, whereupon relay 334 operates as described to terminate the scanning operation.

If only one series of scannings of the two 20-trunk groups is to be accomplished, the described plugs such as 523 and 524, together with plugs such as 513, 514, may be removed. Additionally, key FS1 and level-selecting keys LS1 and LS2 may be restored, to cause 1F1, 1F2, and 1FC to buzz through positions 1 to 10 to home position. At the same time, finder selector FS of FIG. 5 responds to the restoration of key FS1 by buzzing through positions 1 to 10 to reach its home position H.

SCANNING TEN 20-TRUNK GROUPS

If, for example, ten 20-trunk groups are to be scanned during an assumed thirty-six cycle scanning operation of SW200 and the structure of FIG. 5, the preparatory operations are as hereinbefore described to connect the first two 20-trunk groups to levels 1 and 2 of 100-point jacks 521 and 522, in addition to which the third to tenth 20-trunk groups are similarly connected to levels 3 to 10 of jacks 521 and 522. In addition, all of the level-selecting keys LS1 to LS10 are operated, removing ground from all ten conductors 1 to 10 in cable 413, thereby permitting 1F1, 1F2, and 1FC to advance step-by-step through all positions 1 to 10 responsive to group-end pulses over conductor 316 and switch 450. Moreover, all ten of the switches SK1 to SK10 are actuated to permit group switch SW350 to dwell in each of its positions 1 to 10 to place the busy-trunk pulses received by brush B1 on the group meters GM1 to GM10 respectively. Accordingly, a scanning cycle is not counted until SW350 has been advanced ten times (has been permitted to remain on and be stepped from each of the positions 1 to 10) to thereby reach position 11, wherein a cycle-end pulse is delivered as described over conductor 314.

It will be observed that two of the trunk groups are scanned on each complete revolution of SW200, requiring five revolutions thereof to cause finders 1F1, 1F2, and 1FC to take ten steps, and to cause group-meter switch SW350 to take ten steps as described. The assumed thirty-six scanning cycles accordingly require 180 complete rotations of scanning switch SW200. With SW200 requiring twenty-five seconds (as assumed) for a complete revolution, the total time consumed is 4500 seconds (180×125), which is an interval of 75 minutes, or an hour and a quarter.

This same 4500-second interval is required for scanning ten trunk groups each of which has any number of trunks from 11 to 20, when each such group is treated as a group of twenty trunks.

Ten groups of trunks wherein each group has ten trunks or less may be similarly scanned in less than half of the 4500-second interval by making use of all five 10-contact sets of SW200. That may be accomplished by using the connecting facilities of either of the switches 1F1 and 1F2. For example, if ten 10-trunk groups are to be scanned, and if it is selected to use switch 1F1, ten plugs such as 523 and 544 are connected to the respective levels L1 to L10 of jack 521, but no plugs need be connected to jack 522. Plug 573 may be connected to the first level of jack 210 of FIG. 2, and a 5-plug structure as illustrated in FIG. 2A may be connected to the five levels of jack 211, thereby connecting the five 10-conductor sets of conductors in cable 231 together in multiple to cause brushes B1 to B10 of 1F1 to be scanned by SW200 on each ten steps thereof. Five scannings of these brushes are thus made during each revolution of SW200. At this time, all five of the switches S1 to S5 are operated to cause five stepping pulses to be delivered to the motor magnet of SW350 for each revolution of SW200. The first five groups of trunk-busy pulses are accordingly transmitted to the first five meters in the group comprising GM1 to GM10, with the next five groups of busy pulses being transmitted on the next five steps of SW350 to the last five meters of the noted GM group, keeping in mind that all ten of the group switches SK1 to SK10 are operated since ten trunk groups are being scanned. Switches 1F1, 1F2, and 1FC are operated step-by-step as described by pulses over conductor 316, and through switch S450, to call in the ten 10-trunk groups reached through 1F, one at a time. A separate trunk group is thus called in by 1F1 for each ten steps taken by the scanner SW200.

In this example, one complete scanning of all ten 10-trunk groups (one complete cycle of operations of 1F1, 1F2 and 1FC) occurs for each two complete cycle of operations of 1F1, 1F2 and 1FC occurs for each two complete revolutions of SW200. Accordingly, for thirty-six complete scanning cycles, seventy-two revolutions of switch SW200 are required. At twenty-five seconds per revolution, the total number of seconds required is 1800 (72×25). That interval equals 30 minutes, or one-half hour.

If desired, while a first 100 trunks (ten 10-trunk groups) are being scanned by being connected with through the first finder switch 1F1 of the finder of FIG. 5, a second 100 trunks comprising ten 10-trunk groups may be connected to the respective levels L1 to L10 of jack 522 in preparation of their scanning through the action of 1F2. Accordingly, when the first ten groups of trunks have been scanned thirty-six times as described, the scanning operations may be repeated for the second 100 trunks associated with the second switch 1F2 of the finder of FIG. 5. For this purpose, all the change required is the removal of plug 513 from the first level of jack 210 and its replacement by plug 514. Then, when the readings of the ten group meters GM1 to GM10 have been recorded for the ten groups just scanned, the scanning operation is restarted as described.

When one or another of the other ones of the ten group finders (each similar to finder 1 of FIG. 5) is to be employed, the desired one of the finder-selecting keys FS2 to FS10 is operated in place of key FS1. Finder-select FS is responsively operated to hunt for and find the position thereof corresponding to the operated one of the keys FS2 to FS10, as described, whereupon it stops in that position to select the corresponding conductor in cable 414. When one or more of the level-select keys LS1 to LS10 has been operated, brush B2 is grounded, thereby grounding the selected finder-select conductor in group 414. The corresponding one of the finders 2 to 10 is thereby driven from home position as described for the finder 1 of FIG. 5. In this event, plugs similar to 513 and 514 are used in place of plugs 513 and 514 to connect the scanning brushes of the selected finder to jack 210 of the scanner SW200, and plugs similar to 523 and 524 are used to connect the desired trunk groups to jacks similar to 521 and 522 of the selected finder.

In any event, the one of the ten finders being used for scanning is signaled to the observation operator by the lighting of the corresponding one of the lamps 401, from ground supplied by brush B2 of the finder selector FS.

As any described multi-group scanning operation occurs, the successive trunk groups called in are indicated by the lighting of the lamps 402 successively through respective conductors in cable 410, controlled by the active one of the finder-control switches 1FC to 10FC (2FC to 10FC not shown).

While I have described above the principles of my invention in connection with specific apparatus, it is to be clearly understood that this description is made only by way of example and not as a limitation to the scope of my invention.

I claim:

1. Service-observation equipment comprising a group of electroresponsive cumulative call meters so disposed that they are each observable by an observation operator, a trunk finder having observation access to groups of trunks employed in a connection-extending trunking system, the trunks each being arranged to have a busy marking potential applied thereto while in use in extending a connection, means for selecting and marking any said trunk group for observation, means responsive thereto for setting the trunk finder on the marked trunk group to operatively associate the cumulative call meters respectively with the trunks of such marked group and to maintain the trunk finder so set during a desired observation period, group-identifying means included in the foregoing structure for displaying to said observation operator the one of the said trunk groups on which said trunk finder is set, each cumulative call meter including meter-operating means controlled from any said trunk with which such cumulative call meter is operatively associated for cumulatively displaying the number of times such trunk has said busy marking potential applied thereto while such cumulative call meter is operatively associated therewith, and means included in the foregoing structure for displaying to said observation operator at any time while said finder is set on the trunks of any said trunk group which of the trunks of such group have said busy marking potential thereon and which of them do not.

2. Service-observation equipment comprising a group of electroresponsive cumulative call meters, a trunk finder having observation access to groups of trunks employed in a connection-extending trunking system, means for selecting and marking any said trunk group for observation, means responsive thereto for operating the trunk finder to connect the call meters respectively to the trunks of the selected marked group and to maintain them connected during a desired observation period, and means controlled from any connected trunk for operating the connected meter responsive to the trunk being used to extend a connection, whereby the call meters are operated to show the number of connections extended through their respective trunks during the observation interval, any said call meter being maintained operated as long as the trunk so which it is connected remains in use, cumulative electroresponsive elapsed-time meters associated with the call meters respectively, each call meter including contact means for maintaining an operating circuit for its associated elapsed-time meter as long as the call meter is operated, and means for momentarily opening each said operating circuit at frequent predetermined intervals, each operated elapsed-time meter thereupon momentarily restoring and thereupon reoperating whereby each elapsed-time meter is operated to show the number of said predetermined intervals during which its associated trunk is in use during the observation period.

3. Service-observation equipment according to claim 2, further comprising a busy signalling device, each elapsed-time meter including contact means actuated upon operation thereof, and means including the last said contact means for establishing an operating circuit for the busy signalling device subject to all of the elapsed-time meters being in operated condition at the same time, whereby the busy signalling device is in operated condition only when all trunks in the selected group are busy, and means controlled by the busy signalling device for displaying the portion of the observation period during which all trunks in the connected trunk group are in use.

4. Service-observation equipment for trunks employed to extend connections in a connection-extending trunking system wherein each trunk includes a sleeve conductor and means for placing a busy-indicating potential thereon during the time the trunk is in use in extending a connection, the said equipment comprising common busy-test circuitry, a trunk scanner having a series of scanner terminals, means for connecting the sleeve conductors of certain of the trunks to the scanner terminals respectively, the connected trunks comprising a plurality of groups of trunks greater than two, with each trunk group occupying a separate section of the scanner terminals, means for operating the scanner during a predetermined observation period to scan the connected sleeve conductors by connecting the busy-test circuitry in succession and in repeated cycles throughout the observation period to the connected sleeve conductors through the scanner terminals, whereby a trunk-busy pulse is transmitted to the busy-test circuitry on the scanning of each scanner terminal connected to a trunk which is in use, group meters corresponding respectively to the connected groups of trunks, and progressively movable distributor means controlled by the scanner for operatively connecting the common busy-test circuitry to the group meters respectively with each group meter being operatively connected with the busy-test circuitry throughout the scanning of its associated group of trunks, whereby each group meter is operated to record the total number of trunks in use in its associated trunk group when scanned.

5. Service-observation equipment according to claim 4, wherein the said distributor means is a stepping switch having positions corresponding respectively to the said group meters, the said scanner including means for delivering a stepping pulse to the stepping switch on the termination of the scanning of each group, the stepping switch thereupon advancing to its next position to transfer the said association of the said common busy-test circuitry to the next group meter.

6. Service-observation equipment for trunks employed to extend connections in a connection-extending trunking system wherein each trunk includes a sleeve conductor and means for placing a busy-indicating potential thereon during the time the trunk is in use in extending a connection, the said equipment comprising a common busy-test conductor and a trunk scanner having a series of scanner terminals, means for connecting the sleeve conductors of certain of the trunks to the scanner terminals respectively, the connected trunks comprising a plurality of groups of trunks, with each trunk group occupying a separate section of the scanner terminals, means for operating the scanner during a predetermined observation to scan the connected sleeve conductors by connecting the busy-test conductor to the scanner terminals in succession and in repeated cycles throughout the observation period, whereby a trunk-busy pulse is transmitted over the common busy-test conductor on the scanning of each scanner terminal connected to a trunk which is in use, group meters corresponding respectively to the connected groups of trunks, distributor means controlled by the scanner for operatively associating the common busy-test conductor with the group meters respectively during each scanning cycle, with each group meter being operatively associated with the common busy-test conductor throughout the scanning cycle of the trunks of its associated group, whereby each group meter is operated to record the total number of trunks found to be in use during all scanning cycles of the observation period.

7. Service-observation equipment according to claim 6, which further includes a cycle counter and means for operating it to count the cycles of operation of said distributor means, and means responsive to the cycle-counter having counted a predetermined number of cycles for terminating the scanning operation.

8. Service-observation equipment for trunks employed to extend connections in a connection-extending trunking system wherein each trunk includes a sleeve conductor and means for placing a busy-indicating potential thereon during the time the trunk is in use in extending a connection, the said equipment comprising common busy-test circuitry, a group of intermediate conductors equal in number to the trunks of a group containing an intermediate number thereof and a trunk finder for connecting the intermediate conductors respectively to the sleeve conductors of the trunks of any trunk group of a series of trunk groups, a trunk scanner having scanning positions at least twice said intermediate number and means for operating it throughout a given observation interval to connect the busy-test circuitry to the respective intermediate conductors in succession in repeated cycles to scan the intermediate conductors repeatedly, the last said means including plug and jack means for connecting each of said intermediate conductors to at least two of said scanning positions, means for causing the trunk finder to maintain the intermediate conductors connected to the sleeve conductors of the first one of said groups, of trunks during the first scanning cycle of the intermediate conductors, means controlled by the scanner for advancing the trunk finder at the end of each scanning cycle of the intermediate conductors to transfer the intermediate conductors to the sleeve conductors of the next trunk group of the series, whereby the sleeve conductors of the trunks of the series of trunk groups are scanned in succession, the said advance following the scanning of the last trunk group bringing the intermediate conductors back into connection with the sleeve conductors of the first trunk group of the series for a repetition of the scanning cycle of the series of trunk groups.

9. Service-observation equipment according to claim 8, comprising means for recording the total number of trunks found busy separately for each said trunk group during the said observation period, the recording means comprising recorders corresponding respectively to the scanned trunk groups, and recording switching means for operatively connecting said busy-test circuitry to the first recorder during the scanning of the first trunk group and for transferring the busy-test circuitry into operative connection with the next succeeding recorder at the end of the scanning of any trunk group.

10. Service-observation equipment according to claim 8, comprising a cycle counter and means for advancing it one step on each completion of a cycle of scanning of all trunks of all said groups, and means responsive to the advance of the cycle counter to a predetermined cycle-count position for stopping the said scanner to end the said observation period.

References Cited in the file of this patent

UNITED STATES PATENTS

| | | |
|---|---|---|
| 1,194,378 | Goodrum | Aug. 15, 1916 |
| 2,378,541 | Dimond | June 19, 1945 |
| 2,393,403 | Ostline | Jan. 22, 1946 |
| 2,882,340 | Murray | Apr. 14, 1959 |
| 2,976,365 | Young | Mar. 21, 1961 |
| 2,981,799 | Riggen | Apr. 25, 1961 |